United States Patent
Hoover et al.

(10) Patent No.: US 8,977,095 B2
(45) Date of Patent: Mar. 10, 2015

(54) POLARIZATION MAINTAINING OPTICAL FIBERS WITH INTRACORE STRESS MECHANISMS

(71) Applicant: Corning Incorporated, Corning, NY (US)

(72) Inventors: Brett Jason Hoover, Middlebury Center, PA (US); Valery A Kozlov, Painted Post, NY (US); Ming-Jun Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/034,758

(22) Filed: Sep. 24, 2013

(65) Prior Publication Data
US 2014/0212102 A1   Jul. 31, 2014

Related U.S. Application Data

(60) Provisional application No. 61/704,840, filed on Sep. 24, 2012.

(51) Int. Cl.
  *G02B 6/036* (2006.01)
  *G02B 6/024* (2006.01)
(52) U.S. Cl.
  CPC .................................. *G02B 6/024* (2013.01)
  USPC ........................................................ 385/126
(58) Field of Classification Search
  CPC ..... G02B 6/024; G02B 6/2843; G02B 6/3812
  USPC ................................................... 385/123–138
  See application file for complete search history.

(56) References Cited

U.S. PATENT DOCUMENTS

| | | | | |
|---|---|---|---|---|
| 4,354,736 A | * | 10/1982 | Maklad et al. | 385/125 |
| 4,426,129 A | * | 1/1984 | Matsumura et al. | 385/128 |
| 7,116,887 B2 | | 10/2006 | Farroni et al. | |
| 7,158,705 B2 | | 1/2007 | Berkey et al. | |
| 7,386,210 B2 | | 6/2008 | Farroni et al. | |
| 7,697,809 B2 | | 4/2010 | Bookbinder et al. | |
| 8,000,575 B2 | | 8/2011 | Chen et al. | |
| 8,213,070 B2 | * | 7/2012 | Koplow | 359/238 |
| 8,731,357 B2 | * | 5/2014 | Hirano et al. | 385/123 |
| 2004/0086245 A1 | * | 5/2004 | Farroni et al. | 385/123 |
| 2006/0045446 A1 | * | 3/2006 | Berkey et al. | 385/123 |
| 2009/0207483 A1 | * | 8/2009 | Goto | 359/341.1 |
| 2011/0081123 A1 | * | 4/2011 | Pare et al. | 385/124 |
| 2013/0308914 A1 | * | 11/2013 | Hayashi et al. | 385/123 |

* cited by examiner

*Primary Examiner* — Charlie T Peng
(74) *Attorney, Agent, or Firm* — Svetlana Short

(57) ABSTRACT

Polarization maintaining optical fibers and methods for making the same are disclosed herein. According to one embodiment, a polarization maintaining optical fiber includes a cladding portion and a core portion disposed in the cladding portion. The core portion includes a first core region having a first coefficient of thermal expansion CTE1 and a second core region having a second coefficient of thermal expansion CTE2. The first coefficient of thermal expansion CTE1 is not equal to the second coefficient of thermal expansion CTE2. At least one of the first core region and the second core region is non-circular symmetric with respect to a centerline of the polarization maintaining optical fiber.

17 Claims, 7 Drawing Sheets

POLARIZATION MAINTAINING OPTICAL FIBERS WITH INTRACORE STRESS MECHANISMS

CROSS-REFERENCE TO RELATED APPLICATIONS

This application claims the benefit of priority under 35 U.S.C. §119 of U.S. Provisional Application Ser. No. 61/704,840 filed on Sep. 24, 2012 the content of which is relied upon and incorporated herein by reference in its entirety.

BACKGROUND

1. Field

The present specification generally relates to optical fibers and, more specifically, to polarization maintaining optical fibers.

2. Technical Background

Polarization-Maintaining (PM) optical fibers are a class of specialty optical fibers that may be used in a variety of applications including coherent communication systems, navigational controls (gyros), fiber-optic sensors, and, most-recently, in high-brightness fiber lasers.

Conventional PM optical fibers are made by inserting stress-applying-parts adjacent to and external to the core (i.e., the light carrying portion of the optical fiber) in order to induce a non-symmetrical stress field around the core. The stress-applying-parts (SAPs) are generally formed from boron-doped silica glass. The SAPs can have various shapes depending on the methods used for making the fiber. For example, Panda-type PM optical fibers are formed by mechanically drilling a pair of holes around the core of the optical fiber preform and inserting SAPs in the holes prior to drawing the preform into a fiber. The birefringence generated in the PM fibers is due to the anisotropic thermal-stress caused by the mismatch in the coefficient of thermal expansion between the SAPs and the surrounding cladding.

Due to the high absorption of boron doped SAPs, the SAPs must be positioned some distance away from the fiber core in order to avoid high fiber attenuation. Very high boron doping levels (>20% by weight) are generally needed to produce sufficient birefringence in the core. In addition, boron doping in the glass changes the viscosity of the glass significantly, making the glass much softer than the pure silica cladding. As a result, PM fibers with boron doped stress rods are difficult to make and expensive. In the case of multi-core PM fiber or PM fibers with a low cladding diameter, there may be insufficient space in the cladding portion of the optical fiber to accommodate the SAPs.

Accordingly, a need exists for alternative designs for polarization maintaining optical fibers.

SUMMARY

According to one embodiment, a polarization maintaining optical fiber may include a cladding portion and a core portion disposed in the cladding portion. The core portion may include a first core region having a first coefficient of thermal expansion CTE1 and a second core region having a second coefficient of thermal expansion CTE2. The first coefficient of thermal expansion CTE1 is not equal to the second coefficient of thermal expansion CTE2. At least one of the first core region and the second core region may be non-circular symmetric with respect to a centerline of the polarization maintaining optical fiber.

In another embodiment, a polarization maintaining optical fiber may include a cladding and a core portion disposed in the cladding. The core portion may include a first core region and a second core region. The second core region comprises at least one down-dopant and at least one up-dopant such that a relative refractive index difference $\Delta cc$ between the first core region and the second core region is less than 0.1%. A birefringence of the polarization maintaining optical fiber may be greater than $1 \times 10^{-5}$ at wavelengths in a range greater than or equal to 800 nm and less than or equal to 1700 nm.

In yet another embodiment, a polarization maintaining optical fiber may include a cladding portion and a core portion disposed in the cladding portion. The core portion may include a first core region having a first coefficient of thermal expansion CTE1 and a second core region having a second coefficient of thermal expansion CTE2. A difference between CTE1 and CTE2 may be greater than or equal to $1 \times 10^{-7}/°C$. A birefringence of the polarization maintaining optical fiber may be greater than $1 \times 10^{-5}$ at wavelengths in a range greater than or equal to 800 nm and less than or equal to 1700 nm.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
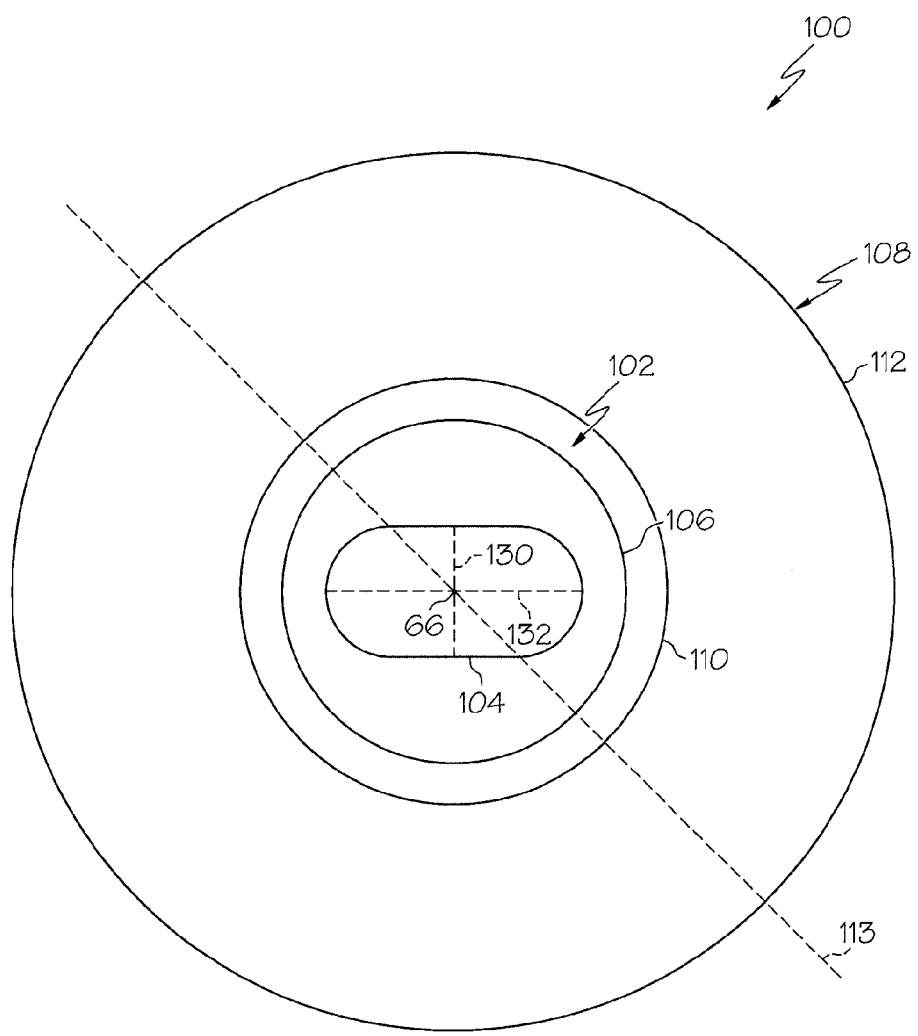
FIG. 1 schematically depicts a cross section of a polarization maintaining (PM) optical fiber, according to one or more embodiments shown and described herein.

Reference will now be made in detail to embodiments of polarization maintaining optical fibers, examples of which are illustrated in the accompanying drawings. Whenever possible, the same reference numerals will be used throughout the drawings to refer to the same or like parts. One embodiment of a polarization maintaining optical fiber is schematically depicted in FIG. 1. The polarization maintaining optical fiber generally comprises a cladding portion and a core portion. The core portion is disposed in the cladding portion and includes a first core region having a first coefficient of thermal expansion CTE1 and a second core region having a second coefficient of thermal expansion CTE2. The first coefficient of thermal expansion CTE1 is not equal to the second coefficient of thermal expansion CTE2. At least one of the first core region and the second core region is non-circular symmetric with respect to a center of the polarization maintaining optical fiber. The polarization maintaining optical fiber may have a birefringence greater than or equal to $1 \times 10^{-5}$ at wavelengths in a range greater than or equal to 800 nm and less than or equal to 1700 nm. Embodiments of polarization maintaining optical fibers will be described in further detail herein with specific reference to the appended drawings.

The phrase "refractive index profile," as used herein, refers to the relationship between refractive index or relative refractive index and the dimensions of the optical fiber.

The phrase "relative refractive index," as used herein, is defined as $\Delta(r) \% = 100 \times (n(r)^2 - n_{REF}^2)/2n_i^2$, where $n_i$ is an extrema of the refractive index in region i (i.e., the minimum or maximum of the refractive index in region i), unless otherwise specified. The relative refractive index percent is measured at 1550 nm unless otherwise specified. The term $n_{REF}$ is the average refractive index of the common outer cladding, which can be calculated, for example, by taking "N" index measurements $(n_{c1}, n_{c2}, \ldots n_{cN})$ of the common outer cladding (which, in some embodiments, may be undoped silica), and calculating the average refractive index by:

$$n_C = (1/N) \sum_{i=1}^{i=N} n_{Ci}$$

As used herein, the relative refractive index is represented by $\Delta$ and its values are given in units of "%," unless otherwise specified. In cases where the refractive index of a region is less than the reference index $n_{REF}$, the relative refractive index is negative and is referred to as having a depressed region or depressed-index, and the minimum relative refractive index is calculated at the point at which the relative refractive index is most negative, unless otherwise specified. In cases where the refractive index of a region is greater than the reference index $n_{REF}$, the relative index percent is positive and the region can be said to be raised or to have a positive index.

The term "birefringence," as used herein, refers to the effective index difference between orthogonal (i.e., x and y) polarization states of a fundamental mode propagating in the core portion of an optical fiber.

Referring now to FIG. 1, one embodiment of a polarization maintaining (PM) optical fiber 100 is schematically depicted in cross section. The PM optical fiber 100 generally includes a core portion 102 which is disposed within and in direct contact with a cladding portion 108. In the embodiments described herein, both the core portion 102 and the cladding portion 108 are formed from silica-based glass. The core portion 102 of the PM optical fiber 100 generally supports the transmission of light through the PM optical fiber 100 while the cladding portion 108 of the PM optical fiber 100 acts to contain the transmitted light within the core portion 102. Accordingly, it should be understood that light transmitted through the PM optical fiber is generally confined to the core potion 102 of the PM optical fiber.

The cladding portion 108 is generally formed from silica-based glass ($SiO_2$) which surrounds and directly contacts the core portion 102. In some embodiments of the PM optical fiber 100 described herein, the cladding portion 108 comprises an overclad portion 110 surrounding the core portion 102 and an outer cladding portion 112 surrounding the overclad portion 110. In these embodiments, the overclad portion 110 of the cladding portion 108 may be formed from silica-based glass which is doped with one or more dopants which decreases the index of refraction of the overclad portion 110, such as boron, fluorine or the like. The outer cladding portion 112 may be formed form un-doped silica-based glass or silica-based glass which includes one or more dopants which decreases the index of refraction of the outer cladding portion 112, such as boron, fluorine or the like. In general, the index of refraction of the cladding portion 108 is less than the index of refraction of the core portion 102 of the PM optical fiber 100.

The optical fibers described herein are polarization maintaining optical fibers. In order to achieve the desired birefringence within the core portion of the optical fiber and thereby maintain the polarization of the propagated light, the core portion 102 of the PM optical fiber 100 is constructed from a first core region 104 with a first coefficient of thermal expansion CTE1 and a second core region 106 with a second coefficient of thermal expansion CTE2 which is not equal to the first coefficient of thermal expansion CTE1. In the embodiments described herein, the absolute value of the difference between the first coefficient of thermal expansion CTE1 of the first core region 104 and the second coefficient of thermal expansion CTE2 of the second core region 106 is greater than or equal to $1 \times 10^{-7}/°$ C. or even greater than or equal to $1 \times 10^{-6}/°$ C.

In addition, at least one of the first core region 104 and the second core region 106 is non-circular symmetric with respect to the centerline $C_L$ of the PM optical fiber. For reference, the phrase "circular symmetric" generally means that a particular structure is symmetric about any straight line drawn through the center point of the structure. For example, a series of concentric circles are circular symmetric about any line drawn through the center point of the concentric circles. However, a non-circular symmetric structure is not symmetric about every straight line drawn through the center point of the structure. For example, the first core region 104 of the PM optical fiber 100 of FIG. 1 is not circular symmetric with respect to the line 113 drawn through the centerline $C_L$ of the PM optical fiber 100.

The asymmetry of at least one of the first core region 104 and the second core region 106 with respect to the centerline of the PM optical fiber in combination with the different coefficients of thermal expansion of the first core region 104 and the second core region 106 creates a stress differential within the core portion 102. The stress differential, in turn, creates birefringence between orthogonal polarized modes of light propagating in the core portion 102 of the PM optical fiber. In the embodiments described herein, the PM optical fibers 100 have a birefringence of greater than or equal to $1 \times 10^{-5}$ in the wavelength range from about 800 nm to about 1700 nm due to the stress differential caused by the difference in the CTEs and the asymmetry of at least one of the core regions. In some embodiments, the PM optical fibers 100 may have a birefringence of greater than or equal to $1 \times 10^{-4}$ of even greater than or equal to $5\times10^{-4}$ over the wavelength range from about 800 nm to about 1700 nm.

While the core portion 102 of the PM optical fibers 100 described herein is constructed from a first core region 104 and a second core region 106, each having different coefficients of thermal expansion, it should be understood that the refractive index n1 of the first core region 104 and the refractive index n2 of the second core region 106 are substantially the same so as not to disrupt the propagation of light through the entire core portion 102 of the PM optical fibers 100. Preferably the index difference between n1 and n2 is less than 0.0014, more preferably less than 0.0005 or most preferably, less than 0.0001.

More specifically, in the embodiments of the PM optical fibers 100 described herein, the first core region 104 generally has a relative refractive index $\Delta c1$ which is less than or equal to 2% relative to the outer cladding portion 112 of the PM optical fiber 100. In some embodiments, the relative refractive index $\Delta c1$ of the first core region 104 is greater than or equal to 0.1% and less than or equal to about 2%. In some other embodiments, the relative refractive index $\Delta c1$ of the first core region 104 is greater than or equal to 0.3% and less than or equal to about 1%. Similarly, the second core region 106 generally has a relative refractive index $\Delta c2$ less than or equal to 2% relative to the outer cladding portion 112 of the PM optical fiber 100. In some embodiments, the relative refractive index $\Delta c2$ of the second core region 106 is greater than or equal to 0.1% and less than or equal to about 2%. In some other embodiments, the relative refractive index $\Delta c2$ of the second core region 106 is greater than or equal to 0.3% and less than or equal to about 1%.

In some embodiments of the PM optical fibers 100 described herein, the difference in the relative refractive index of the first core region 104 and the relative refractive index of the second core region 106 is minimized so as not to disrupt the propagation of light through the core portion 102 of the PM optical fiber. Specifically, in some embodiments described herein, the relative refractive index difference $\Delta cc=|\Delta c1-\Delta c2|$ and is less than or equal to 0.1%. Preferably, in some embodiments, the relative refractive index difference $\Delta cc$ is less than or equal to 0.05% or, more preferably, less than or equal to 0.01%. Accordingly, it should be understood that light propagating through the first core region 104 and the second core region 106 travels at essentially the same speed in both regions.

A PM optical fiber 100 having core regions with different CTEs and in which the relative refractive index difference $\Delta cc$ is minimized, as described above, may be created using several different techniques. In one embodiment, the core regions are doped with different doping materials such that the core regions 104, 106 have different compositions and, therefore, different coefficients of thermal expansion while the relative refractive index difference $\Delta cc$ between the core regions is minimized. For example, in one embodiment, the first core region 104 may be formed from relatively pure (i.e., undoped) silica glass. In the embodiments described herein, relatively pure silica glass contains less than about 0.1 wt. % of impurities, tramp components, and the like. In this embodiment, the second core region 106 may be co-doped with one or more dopants which increases the index of refraction of silica glass (i.e., up-dopants), such as $GeO_2$, $TiO_2$, $ZrO_2$, $Nb_2O_5$ and/or $Ta_2O_5$, and one or more dopants which decreases the index of refraction of silica glass (i.e., down-dopants), such as $B_2O_3$, fluorine, or the like. The addition of the dopants to the silica glass of the second core region 106 changes the coefficient of thermal expansion CTE2 of the second core region 106 with respect to the coefficient of thermal expansion CTE1 of the first core region 104. However, co-doping the silica glass of the second core region 106 with appropriate amounts of up-dopants and down-dopants results in a net relative refractive index change of about zero in the second core region 106 such that the relative refractive index $\Delta c2$ of the second core region 106 is substantially the same as the relative refractive index $\Delta c1$ of the first core region 104, thereby minimizing the relative refractive index difference $\Delta cc$ between the first core region 104 and the second core region 106.

While the aforementioned technique for creating a CTE difference between the first core region 104 and the second core region 106 involves doping the silica glass of the second core region 106 while leaving the silica glass of the first core region 104 un-doped, it should be understood that similar effects can be achieved by co-doping the silica glass of the first core region 104 with up-dopants and down-dopants while leaving the silica glass of the second core region un-doped.

Alternatively, the same effect can be achieved by up-doping or down-doping one of the first core region 104 or the second core region 106 and co-doping the other region such that the coefficients of thermal expansion of the first core region 104 and the second core region 106 are different while the relative refractive index difference $\Delta cc$ between the first core region 104 and the second core region 106 is minimized. For example, in one embodiment, the first core region 104 may be up-doped by including a dopant which increases the index of refraction of silica glass, such as $GeO_2$ or the like, in the silica glass of the first core region 104. In order to produce the desired difference in the coefficient of thermal expansion between the first core region 104 and the second core region 106, the second core region 106 is co-doped with both an up-dopant and a down-dopant in amounts sufficient to match the change in the index of refraction of the first core region 104 such that the relative refractive index difference $\Delta cc$ between the first core region 104 and the second core region 106 is minimized while imparting a different coefficient of thermal expansion to the second core region 106.

Accordingly, it should be understood that the desired differential in the coefficients of thermal expansion and minimal relative refractive index difference $\Delta cc$ can be achieved by co-doping at least one of the first core region and the second core region to thereby achieve a stress differential in the core portion 102 of the PM optical fiber 100.

Figure 2A:
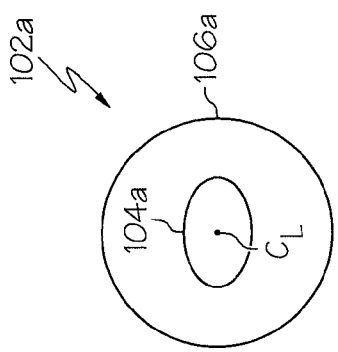
FIGS. 2(a)-2(f) depict cross sections of different embodiments of core portions of PM optical fibers.
Figure 2B:
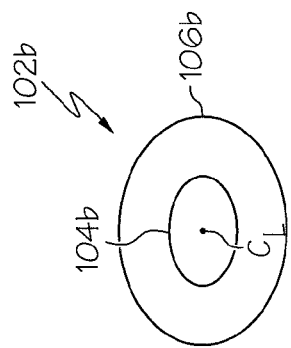
Figure 2C:
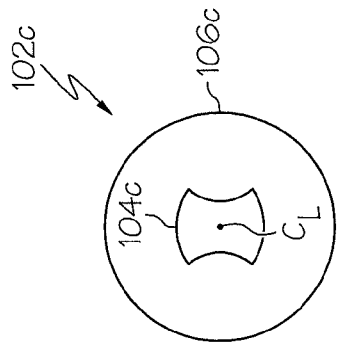

As noted hereinabove, the asymmetry (i.e., the non-circular symmetry) of at least one of the first core region 104 and the second core region 106 with respect to the centerline of the PM optical fiber 100 assists in achieving the desired birefringence in the PM optical fiber 100 by creating a stress differential within the core portion of the PM optical fiber. The non-circular symmetry of at least one of the first core region 104 and the second core region 106 with respect to the centerline of the PM optical fiber 100 may be achieved in a number of different ways. Referring to FIGS. 1 and 2(a)-2(c) by way of example, the embodiment of the PM optical fiber 100 depicted in FIG. 1 includes a core portion 102 in which the first core region 104 is an elongated structure having a major axis 132 and a minor axis 130 such that the aspect ratio of the first core region 104 (i.e., the ratio of the major axis to the minor axis) is greater than 1 and the first core region 104 is not circular symmetric with respect to the centerline $C_L$ of the PM optical fiber. Similarly, FIG. 2(a) schematically depicts a core portion 102a of a PM optical fiber in which the first core region 104a is an elongated structure (i.e., the first core region 104a has an elliptical shape with major and minor axes) such that the first core region 104a is not circular symmetric with respect to the centerline $C_L$ of the PM optical fiber. FIG. 2(b) schematically depicts another embodiment or a core portion 102b in which the first core region 104b and the second core region 106b are ellipses oriented such that neither the first core region 104b nor the second core region 106b are circular symmetric with respect to the centerline $C_L$ of the PM optical fiber. FIG. 2(c) schematically depicts a core portion 102c of a PM optical fiber in which the first core region 104c is an elongated shape oriented in the second core region 106c such that the first core region 104c is non-circular symmetric with respect to the centerline $C_L$ of the PM optical fiber. In embodiments of PM optical fibers in which either the first core region or the second core region comprises an elongated structure, such as an oval, ellipse, or the like, the major and minor axes of the elongated structure are generally sized such that an aspect ratio of the elongated structure (i.e., the ratio of the major axis to the minor axis) is greater than about 1.2, preferably greater than about 1.5, and more preferably, greater than about 2.

Figure 2D:
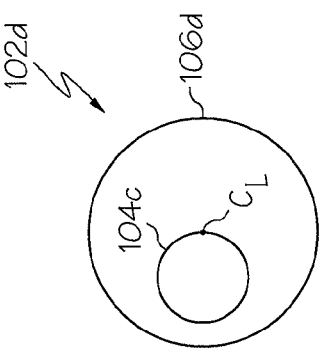
Figure 2E:
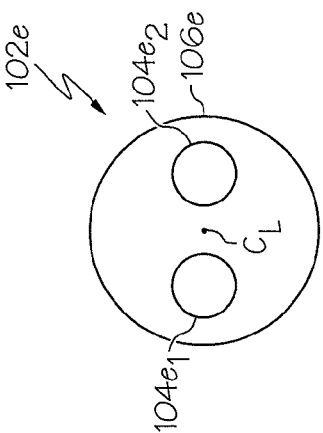

While FIGS. 1 and 2(a)-2(c) schematically depict a core portion of a PM optical fiber in which at least one of the first core region and the second core region are elongated structures such that at least one of the first core region and the second core region are non-circular symmetric with respect to the centerline of the PM optical fiber, it should be understood that other embodiments of the core portion are contemplated. Referring to FIGS. 2(d)-2(e) by way of example, a core region of the core portion of the optical fiber may be non-circular symmetric with respect to the centerline $C_L$ of the optical fiber by positioning an otherwise symmetric core region away from the centerline $C_L$ of the PM optical fiber. For example, FIG. 2(d) schematically depicts a core portion 102d of a PM optical fiber which includes a circular first core region 104d which is positioned within a circular second core region 106d. However, while the circular second core region 106d is concentric with the centerline $C_L$ of the PM optical fiber, the first core region 104d is non-concentric with the centerline $C_L$ of the PM optical fiber such that the first core region is non-circular symmetric with respect to the centerline $C_L$ of the PM optical fiber.

Alternatively, one of the core regions of the core portion may comprise a plurality of core region segments which are non-circular symmetric with respect to the centerline $C_L$ of the PM optical fiber. For example, FIG. 2(e) schematically depicts a core portion 102e of a PM optical fiber which includes circular core region segments 104e1, 104e2 positioned in a circular second core region 106e which is centered on the center line $C_L$ of the PM optical fiber. The circular core region segments 104e1, 104e2 are non-concentric with the center line $C_L$ of the PM optical fiber such that the circular core region segments 104e1, 104e2 are non-circular symmetric with respect to the centerline $C_L$ of the PM optical fiber.

Figure 2F:
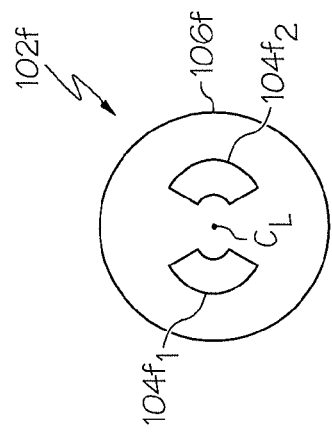

Similarly, FIG. 2(f) schematically depicts a core portion 102f of a PM optical fiber which includes semi-circular core region segments 104f1, 104f2 positioned in a circular second core region 106f which is centered on the center line $C_L$ of the PM optical fiber. The semi-circular core region segments 104f1, 104f2 are non-concentric with the center line $C_L$ of the PM optical fiber such that the semi-circular core region segments 104f1, 104f2 are non-circular symmetric with respect to the centerline $C_L$ of the PM optical fiber.

A method of forming a PM optical fiber will now be described in more detail with specific reference to FIGS. 3-4.

In one embodiment, the core portion 102, and cladding portion 108 of the PM optical fiber 100 may be formed by an outside-vapor-deposition (OVD) process. The OVD process is a way of making optical fiber through reactions from the desired vapor ingredients (including silica and the other desired dopant precursors) via a pyrolysis process in a $CH_4 + O_2$ flame to form soot-particles, which are then collected by thermophoretic means onto a glass core cane or rod. The soot-preform is subsequently dried and densified into solid transparent glass in a high temperature furnace, a process commonly referred to as consolidation. The desired core and cladding compositions are achieved by utilizing different amounts of various vapor-phase ingredients for each of the layers in the soot preform fabrication process. For example, the core/cladding perform may be generated first, then consolidated, and the final (consolidated) preform drawn into the optical fiber by known fiber-drawing methods.

Figure 3:
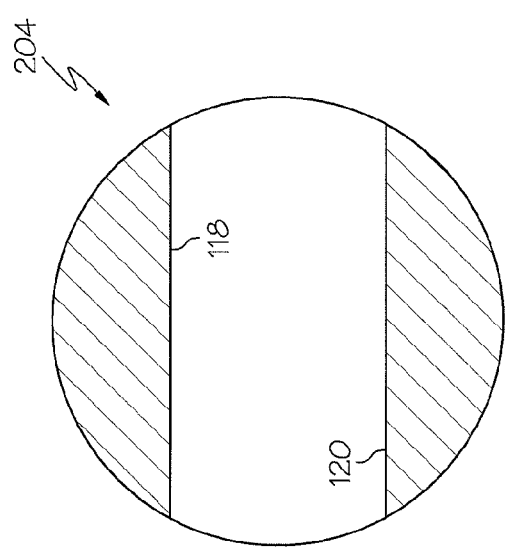
FIG. 3 schematically depicts a cross section of a core region of a PM optical fiber preform, according to one or more embodiments shown and described herein.
Figure 4:
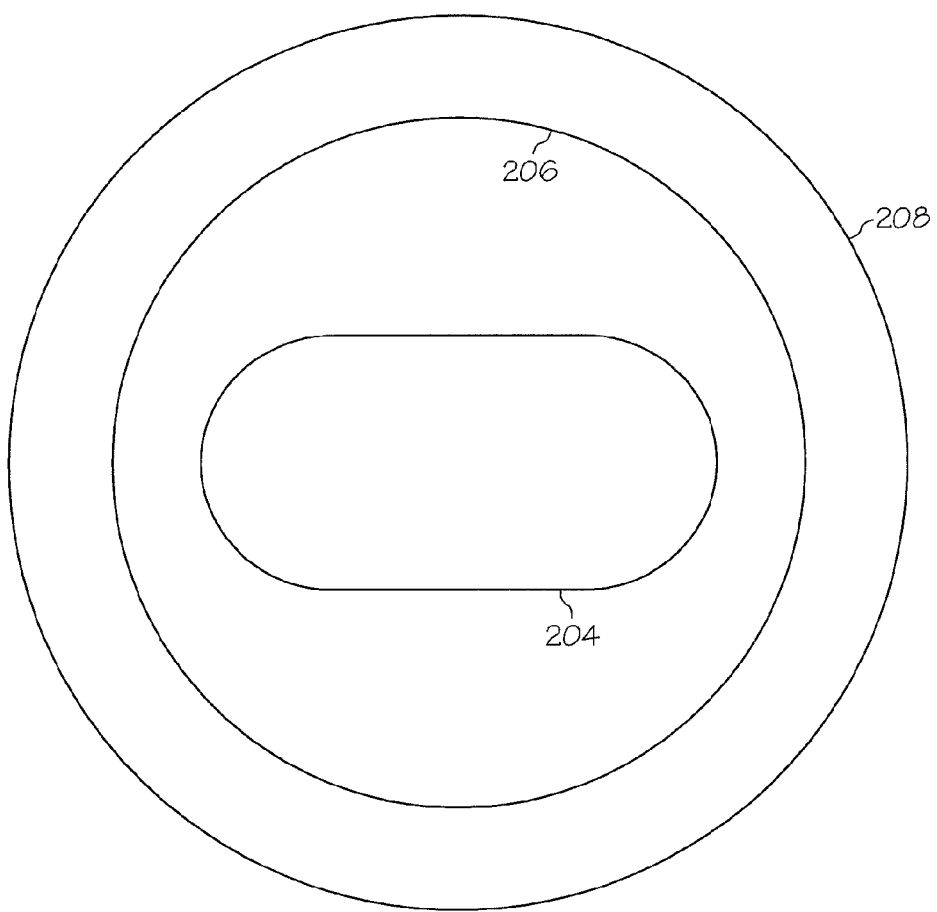
FIG. 4 schematically depicts a cross section of the core portion of a PM optical fiber preform surrounded by an overclad layer, according to one or more embodiments shown and described herein.

Referring now to FIGS. 3-4, in one embodiment, an optical fiber preform for forming the PM optical fiber 100 is formed by depositing silica-glass soot on a preformed silica-glass core cane 204. An exemplary silica-glass core cane 204 is schematically depicted in cross section in FIG. 3. In this embodiment, the core cane 204 is used to form the non-circular symmetric core region of the PM optical fiber. The core cane 204 may comprise relatively pure silica-glass or, alternatively, silica glass up-doped with one or more dopants which increases the index of refraction of the silica glass, including, without limitation, $GeO_2$ or the like. The core cane 204 may be initially prepared as a cylindrical rod and, thereafter, machined in order to achieve a cross-sectional profile which is non-circular symmetric. For example, in the embodiment of the core cane 204 schematically depicted in FIG. 3, the core cane 204 is machined to form a pair of "flats" 118, 120 on opposing side of the core cane, thereby giving the core cane 204 an elongate cross section.

Referring now to FIG. 4, once the core cane 204 is formed and shaped, silica glass soot may be deposited on the core cane 204 to form a region corresponding to the second core region of the optical fiber. The soot deposited may be up-doped with at least one dopant which increases the index of refraction of silica glass and, simultaneously, changes the coefficient of thermal expansion of the silica glass relative to the core cane 204. More specifically, vapor-precursor-materials that may be used to make the portion of the soot preform associated with the second core region include up-dopants such as, for example, $GeCl_4$, $AlCl_3$, $TiCl_4$, or $POCl_3$. After the up-doped $SiO_2$ soot is deposited on the core cane 204, the up-doped soot may be consolidated on the core cane 204 to form a region 206 of solid glass surrounding the core cane 204. This region 206 generally corresponds to the second core region of the core portion of the PM optical fiber. The up-doped glass soot of region 206 is consolidated in the presence of a gas containing a down-dopant, such as fluorine (F) present in $SiF_4$, such that, after consolidation, region 206 includes both an up-dopant and a down-dopant. As noted hereinabove, co-doping region 206 with an up-dopant and a down-dopant yields a region of silica-based glass with a different coefficient of thermal expansion than the core cane 204 while minimizing the relative refractive index difference between the two regions.

Thereafter, a layer of glass soot is deposited around region 206 to form an outer region 208 which generally corresponds to the overclad portion of the PM optical fiber. In the embodiments described herein, outer region 208 may be initially formed by depositing relatively pure silica glass soot around region 206 by outside vapor deposition. The soot is in region 208 is then consolidated in a furnace with a fluorine containing compound, for example with $SiF_4$, $CF_4$ or $BF_3$, such that silica glass in region 208 is down-doped. Thereafter, one or more additional layers of silica glass soot (not shown) may be deposited over region 208 and consolidated to form additional cladding layers. The preform may then be drawn into optical fiber using conventional fiber drawing techniques.

Figure 5:
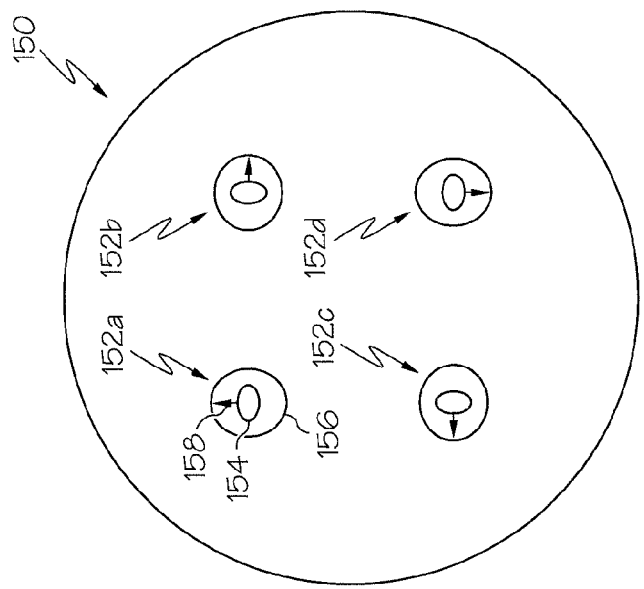
FIG. 5 schematically depicts a cross section of a multi-core PM optical fiber according to one or more embodiments shown and described herein.

While FIG. 1 schematically depicts a PM optical fiber 100 which includes a single core portion 102, it should be understood that PM optical fibers with multiple core portions are also contemplated. For example, FIG. 5 schematically depicts a PM optical fiber 150 which includes multiple core portions 152a-152d. Each core portion generally comprises an elliptical first core region 154 positioned in a circular second core region 156. In the embodiment of the PM optical fiber 150 shown in FIG. 5, each core portion 152a-152d is oriented at an angle of 90° with respect to each adjacent core portion, as indicated by orientation arrow 158, which may aid in improving the coupling connection between different pieces of fiber. Accordingly, it should be understood that, in some embodiments, adjacent core portions need not be aligned with one another. However, in alternative embodiments, each core portion may be aligned with every other core portion while, in still other embodiments, the orientation of each core portion is completely random with respect to every other core portion.

Further, while FIG. 5 schematically depicts the core portions 152a-152d of the PM optical fiber 150 being laid out in a rectangular matrix, it should be understood that other layouts are contemplated. For example, each of the core portions may be oriented in a single row or a plurality of rows, such as when the multi-core PM optical fiber has a ribbon configuration. Alternatively, the core portions of the multi-core PM optical fiber may be oriented in a triangular matrix.

EXAMPLES

The embodiments of the PM optical fiber described herein will be further clarified by the following examples.

Example 1

Figure 6:
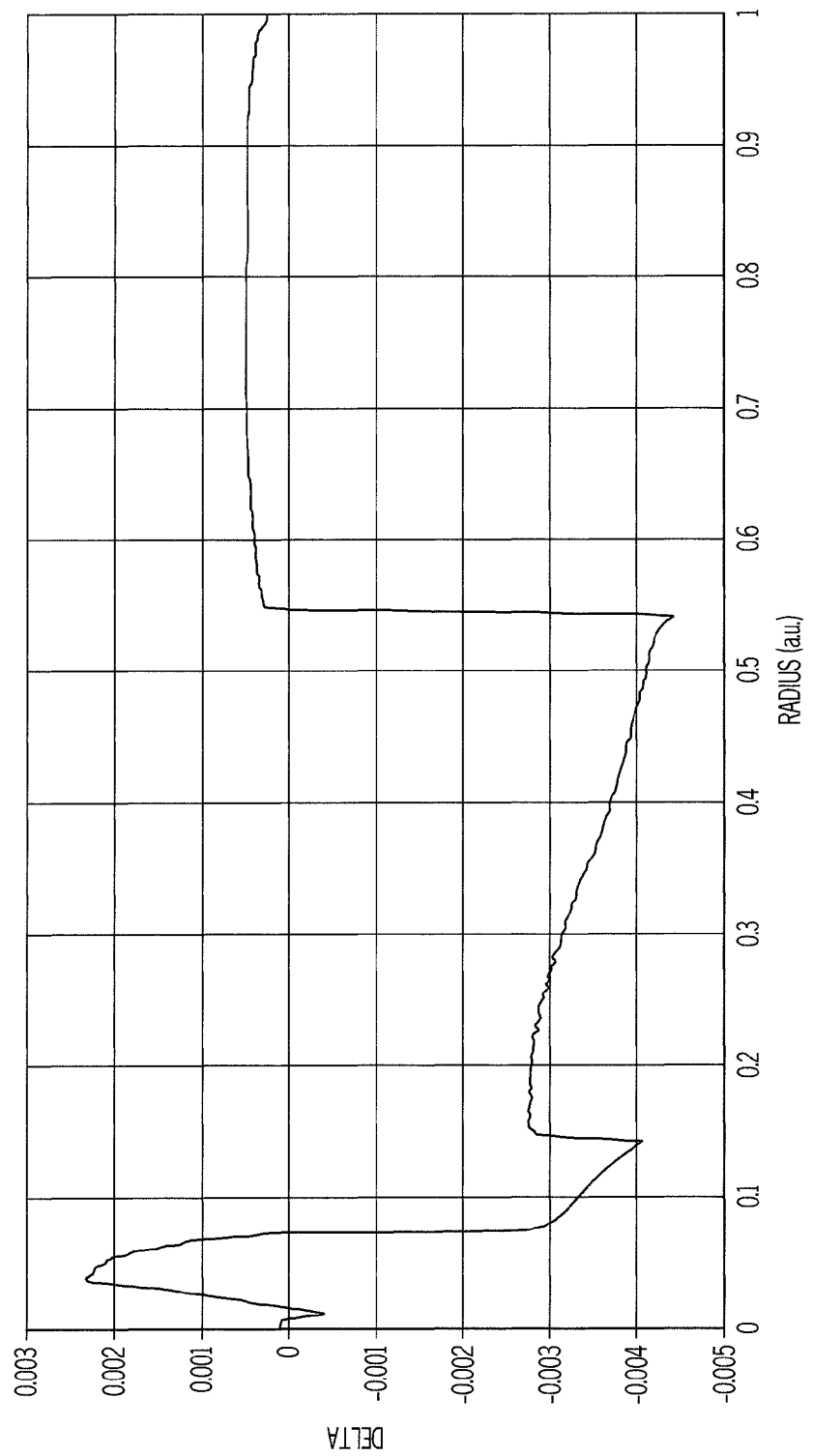
FIG. 6 schematically depicts the relative refractive index profile of the PM optical fiber of FIG. 1, according to one or more embodiments shown and described herein.

A single core PM optical fiber as depicted in FIG. 1 was produced and the properties of the PM optical fiber (i.e., the beat length/birefringence) were measured. Specifically, a core cane of pure silica glass was machined such that the core cane had a cross section as depicted in FIG. 3. Thereafter, silica glass soot doped with $GeO_2$ was deposited on the core cane. The silica glass soot comprised 5.7 wt. % $GeO_2$ such that the corresponding glass region initially had a relative refractive index $\Delta c2$ of 0.35%. Thereafter, the silica glass soot was consolidated in the presence of fluorine such that the consolidated glass included 1.3 wt. % fluorine. This amount of fluorine offset the increase in the refractive index of the glass due to $GeO_2$ doping such that the net change in the relative refractive index of the glass core was zero. A fluorine doped overclad layer was deposited around the core portion and an outer cladding of relatively pure silica glass was deposited around the overclad layer. The refractive index profile of the resultant PM optical fiber preform is graphically depicted in FIG. 6. The preform was drawn into optical fiber which included a round core portion having a diameter of 7.8 μm. The core portion included an elliptical insert of pure silica glass which had a major axis measuring 3.28 μm and a minor axis of 2.31 μm.

The birefringence of the optical fiber was then determined using the polarization beat length measurement. To perform the measurement, a broadband light source is polarized and launched into a fiber having a test length L. The polarization direction of the light is adjusted to an angle of about 45° to the x-birefringence axis of the fiber to excite both the x and y polarized modes. A polarizer is placed at an angle of about 45° to the x-birefringence axis at the output of fiber. The output light is detected and the spectrum is analyzed to get the beat length. That spectrum will exhibit oscillations with a period $\Delta\lambda$, from which the polarization beat length can be calculated by:

$$L_B = (\Delta\lambda/\lambda)L$$

The birefringence is related to the beat length by $$B = \lambda/L_B.$$

Figure 7:
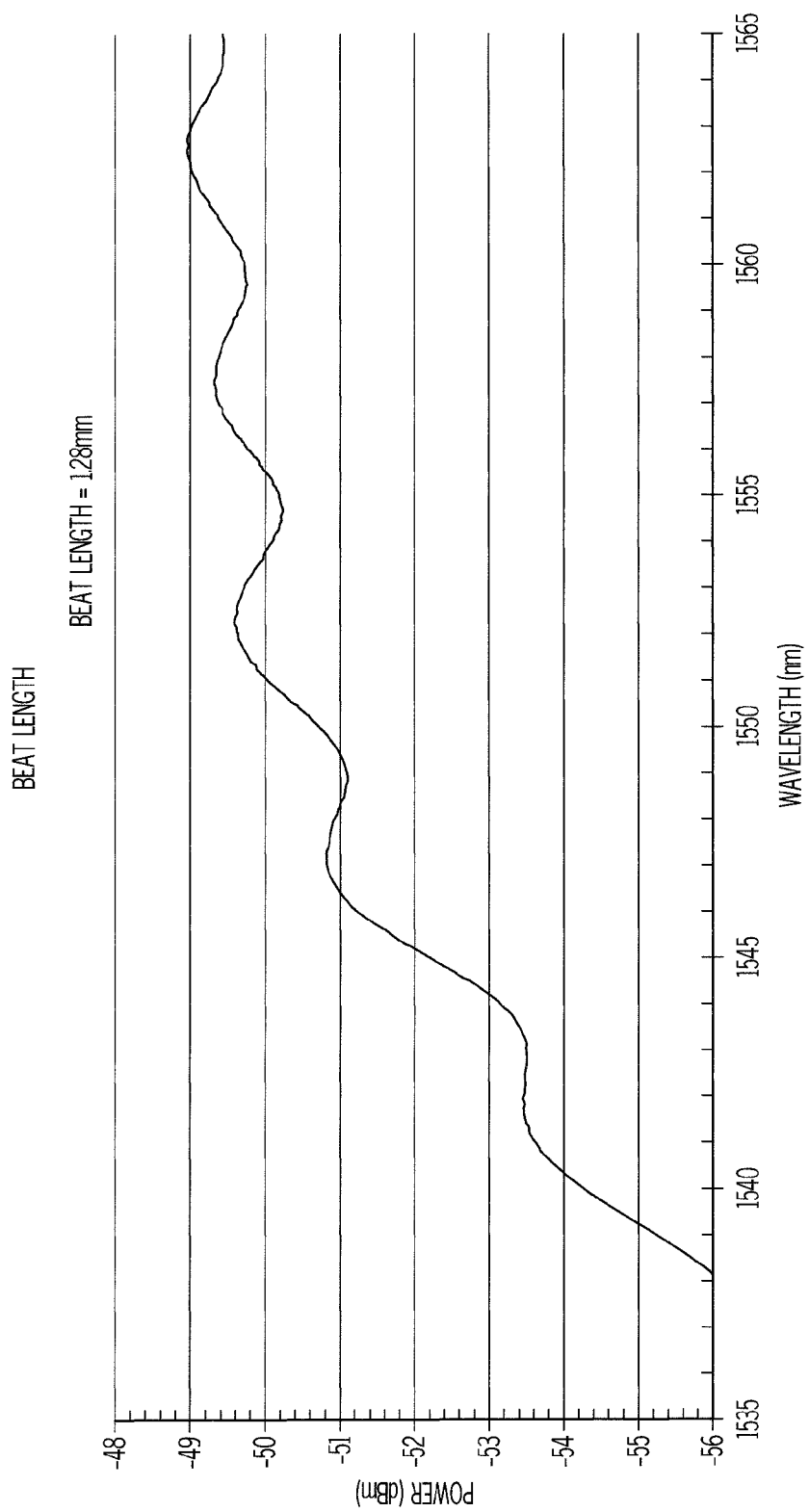
FIG. 7 graphically depicts the beat length (i.e., the power loss (y-axis) as a function of wavelength (x-axis)) for a PM optical fiber.

The measurement was performed at 1550 nm with a super luminescent diode (SLD) light source and an optical spectral analyzer (OSA) detector. From the oscillations in the OSA signal (FIG. 7) it was determined that the PM optical fiber had a beat length of 1.28 mm which corresponds to a birefringence of $1.2 \times 10^{-3}$ at 1550 nm.

Example 2

A multiple core PM optical fiber as depicted in FIG. 5 was produced and the properties of the PM optical fiber (i.e., the beat length/birefringence) were measured. Specifically, the core portions of the PM optical fiber were produced using core canes of pure silica glass was machined such that the core cane had a cross section as depicted in FIG. 3. Thereafter, silica glass soot doped with $GeO_2$ was deposited on each of the core canes. The silica glass soot comprises 5.7 wt. % $GeO_2$ such that the corresponding glass region initially had a relative refractive index $\Delta c2$ of 0.35%. Thereafter, the silica glass soot was consolidated in the presence of fluorine such that the consolidated glass included 1.3 wt. % fluorine. This amount of fluorine offset the increase in the refractive index of the glass due to $GeO_2$ doping such that the net change in the relative refractive index of the glass core was zero. The core preform was drawn into core canes each having a diameter of 9 mm. A fluorine dopes glass blank having a diameter of 43 mm was drilled with four holes parallel to the long axis of the blank. Each hole had a diameter of 9 mm. The core canes were inserted into the holds in the blank and sealed to form an overcladded preform. Each core portion of the multicore PM optical fiber was oriented at 90° with respect to each adjacent core portion, as described above. The preform was drawn into optical fiber which had an outer diameter of 120 μm. The optical fiber included a round core portion having a diameter of 8.2 μm. The core portion included an elliptical insert of pure silica glass which had a major axis measuring 3.45 μm and a minor axis of 2.43 μm.

Figure 8:
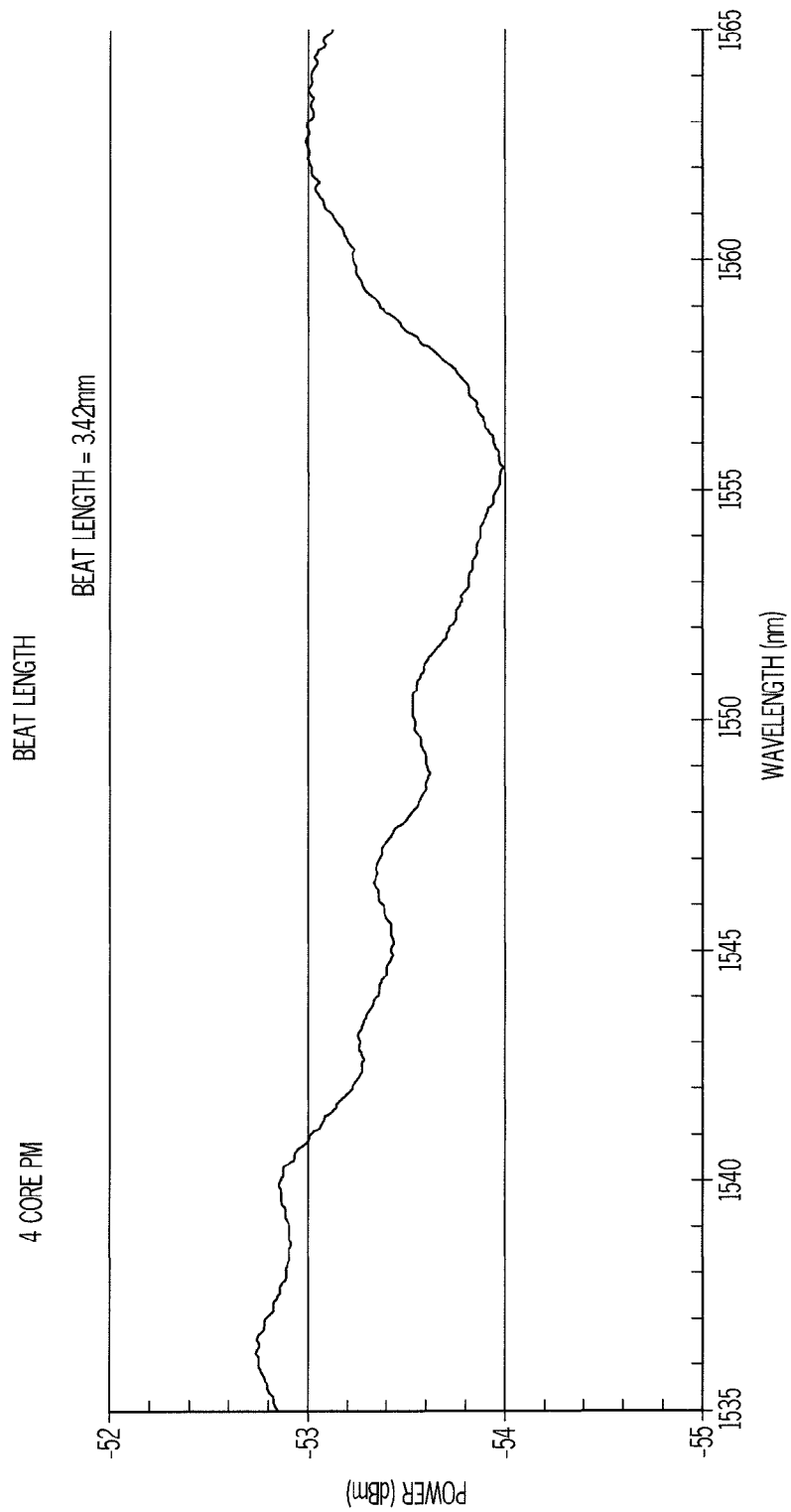
FIG. 8 graphically depicts the beat length (i.e., the power loss (y-axis) as a function of wavelength (x-axis)) for a core portion of the multi-core PM optical fiber of FIG. 5.

The birefringence of the optical fiber was then determined using the polarization beat length measurement as described above. The measurement was performed at 1550 nm with an SLD light source and an OSA detector. From the oscillations in the OSA signal (FIG. 8) it was determined that the PM optical fiber had a beat length of 3.42 mm which corresponds to a birefringence of $6.5 \times 10^{-4}$ at 1550 nm.

It should now be understood that the PM optical fibers described herein utilize a multi-region core in order to achieve a desired birefringence in the optical fiber. Specifically, the PM optical fibers described herein include a core portion which includes at least a first core region and a second core region, each of which have a different coefficient of thermal expansion. At least one of the first core region and the second core region is also non-circular symmetric with respect to the centerline of the optical fiber. The combination of the difference in CTEs with the designed asymmetry of at least one of the core regions creates a stress differential within the core portion of the optical fiber thereby facilitating the polarization maintaining properties of the optical fiber. Moreover, creating first and second core regions with different coefficients of thermal expansion without disrupting the light transmission properties of the core portion of the optical fiber is achieved by doping at least one of the core regions with both up-dopants and down-dopants such that the coefficient of thermal expansion of the core region is changed without changing the index of refraction of the core region relative to the other core region.

PM optical fibers as described herein (i.e., PM optical fibers without stress applying parts in the cladding portion) are an improvement over conventional PM optical fibers in which the stress applying parts are external to the core portion. For example, creating the applied stress within the core portion of the optical fiber reduces the thickness of the cladding of the optical fiber, thereby providing a more compact, lower cost optical fiber. This also facilitates positioning additional core elements within the cladding, thereby facilitating multi-core PM optical fibers. Further, because the stress inducing the birefringence is generated within the core portion of the optical fiber, less stress is required to achieve the same level of birefringence.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A polarization maintaining optical fiber comprising:
    a cladding portion; and
    a core portion disposed in the cladding portion, the core portion comprising a first core region having a first coefficient of thermal expansion CTE1 and a second core region having a second coefficient of thermal expansion CTE2, wherein:
        the first coefficient of thermal expansion CTE1 is not equal to the second coefficient of thermal expansion CTE2;
        at least one of the first core region and the second core region is non-circular symmetric with respect to a centerline of the polarization maintaining optical fiber;
        the first core region is positioned within the second core region; and
        a refractive index of the first core region and a refractive index of the second core region are substantially the same.

2. The optical fiber of claim 1, wherein a relative refractive index $\Delta c1$ of the first core region relative to the cladding is less than or equal to about 2%.

3. The optical fiber of claim 1, wherein a relative refractive index $\Delta c2$ of the second core region relative to the cladding is less than or equal to about 2%.

4. The optical fiber of claim 1, wherein a difference between CTE1 and CTE2 is greater than or equal to $1 \times 10^{-7}/°C$.

5. The optical fiber of claim 1, wherein the first core region is substantially free from dopants and the second core region comprises at least one down-dopant and at least one up-dopant.

6. The optical fiber of claim 5, wherein the second core region comprises $GeO_2$ and fluorine.

7. The optical fiber of claim 1, wherein a birefringence of the polarization maintaining optical fiber is greater than $1 \times 10^{-5}$ at wavelengths in a range greater than or equal to 800 nm and less than or equal to 1700 nm.

8. The optical fiber of claim 1, wherein at least one of the first core region and the second core region has an elongated cross section with an aspect ratio greater than about 1.2.

9. A polarization maintaining optical fiber comprising:
    a cladding; and
    a core portion disposed in the cladding, the core portion comprising a first core region positioned within a second core region, wherein the second core region comprises at least one down-dopant and at least one up-dopant such that a relative refractive index difference $\Delta cc$ between the first core region and the second core region is less than 0.1%; and
    a birefringence of the polarization maintaining optical fiber is greater than $1 \times 10^{-5}$ at wavelengths in a range greater than or equal to 800 nm and less than or equal to 1700 nm;
    wherein at least one of the first core region and the second core region is non-circular symmetric with respect to a centerline of the polarization maintaining optical fiber.

10. The optical fiber of claim 9, wherein the first core region has a first coefficient of thermal expansion CTE1 and the second core region has a second coefficient of thermal expansion CTE2, and the first coefficient of thermal expansion CTE1 is not equal to the second coefficient of thermal expansion CTE2.

11. The optical fiber of claim 10, wherein a difference between CTE1 and CTE2 is greater than or equal to $1 \times 10^{-7}/°C$.

12. The optical fiber of claim 9, wherein:
    a relative refractive index $\Delta c1$ of the first core region relative to the cladding is less than or equal to about 2% and greater than or equal to about 0.1%; and
    a relative refractive index $\Delta c2$ of the second core region relative to the cladding is less than or equal to about 2% and greater than or equal to about 0.1%.

13. The optical fiber of claim 9, wherein the first core region is substantially free from dopants.

14. A polarization maintaining optical fiber comprising:
    a cladding portion; and
    a core portion disposed in the cladding portion, the core portion comprising a first core region having a first coefficient of thermal expansion CTE1 and a second core region having a second coefficient of thermal expansion CTE2, wherein:
        a difference between CTE1 and CTE2 is greater than or equal to $1 \times 10^{-7}/°C$.; and
        a birefringence of the polarization maintaining optical fiber is greater than $1 \times 10^{-5}$ at wavelengths in a range greater than or equal to 800 nm and less than or equal to 1700 nm;
        wherein the first core region is positioned within the second core region and at least one of the first core region and the second core region is non-circular symmetric with respect to a centerline of the polarization maintaining optical fiber and a refractive index of the first core region is substantially the same as a refractive index of the second core region.

15. The optical fiber of claim 14, wherein the birefringence of the polarization maintaining optical fiber is greater than $1 \times 10^{-4}$ at wavelengths in a range greater than or equal to 800 nm and less than or equal to 1700 nm.

16. The optical fiber of claim 14, wherein at least one of the first core region and the second core region has an elongated cross section with an aspect ratio greater than about 1.2.

17. The optical fiber of claim 14, wherein at least one of the first core region and the second core region comprises an up-dopant and a down-dopant.

\* \* \* \* \*